United States Patent
James et al.

(10) Patent No.: US 11,248,128 B2
(45) Date of Patent: Feb. 15, 2022

(54) UVA MULTIFUNCTIONAL POWDER COATING ADDITIVE COMPOSITION

(71) Applicant: PISON IP HOLDCO LLC, Brecksville, OH (US)

(72) Inventors: Joseph Henry James, Brecksville, OH (US); Sanjana Das, Brooklyn, NY (US)

(73) Assignee: PISON IP HOLDCO LLC, Brecksville, OH (US)

( * ) Notice: Subject to any disclaimer, the term of this patent is extended or adjusted under 35 U.S.C. 154(b) by 75 days.

(21) Appl. No.: 16/773,407

(22) Filed: Jan. 27, 2020

(65) Prior Publication Data

US 2020/0239705 A1   Jul. 30, 2020

Related U.S. Application Data

(60) Provisional application No. 62/798,049, filed on Jan. 29, 2019.

(51) Int. Cl.
| | | |
|---|---|---|
| *C09D 5/03* | (2006.01) | |
| *C09D 7/40* | (2018.01) | |
| *C09D 183/04* | (2006.01) | |

(52) U.S. Cl.
CPC ............ *C09D 5/033* (2013.01); *C09D 5/031* (2013.01); *C09D 7/70* (2018.01); *C09D 183/04* (2013.01)

(58) Field of Classification Search
CPC .......... C09D 5/033; C09D 7/70; C09D 5/031; C09D 183/04
USPC ........................................................ 524/588
See application file for complete search history.

(56) References Cited

U.S. PATENT DOCUMENTS 9,353,254 B1 * 5/2016 James .................. C09D 123/06

* cited by examiner

*Primary Examiner* — Ling Siu Choi
*Assistant Examiner* — Ronald Grinsted
(74) *Attorney, Agent, or Firm* — Duane Morris LLP; Gregory M. Lefkowitz

(57) ABSTRACT

An ultraviolet light absorber (UVA) Universal Composition powder coating is provided. The composition can include about 73.0 to about 78.0 weight percent (wt. %) of a silicone resin, about 2.0 to about 7.0 wt. % of a hardener, about 0.7 to about 1.2 wt. % of a UV stabilizer, about 0.7 to about 1.2 wt. % of a flow modifier, about 15.0 to about 20.0 wt. % of a glass flake, and about 0.1 to about 0.6 wt. % of a catalyst. A UVA additive composition including a plurality of UVA additive particles having a continuous phase of a silicon resin that contains a hardener, a UV stabilizer, a flow modifier, glass flakes, and a catalyst, wherein the plurality of UVA additive particles have a particle size of 0.5 to 100 μm, is also provided.

10 Claims, No Drawings

UVA MULTIFUNCTIONAL POWDER COATING ADDITIVE COMPOSITION

CROSS-REFERENCE TO RELATED APPLICATIONS

This application claims the benefit of priority under 35 U.S.C. § 119(e) of U.S. Provisional Application Ser. No. 62/798,049, filed on Jan. 29, 2019, the content of which is relied upon and incorporated herein by reference in its entirety.

BACKGROUND

The disclosure relates to powder coating compositions, and more particularly to multifunctional Ultraviolet Light Absorber (UVA) additive compositions.

Powder coating compositions are dry, free-flowing powders adapted to be applied in a fusion coating process. In a fusion coating process, a coating powder is distributed over a substrate and, when heated, fuses to form a continuous film on the substrate. The substrate may be heated or unheated when the powder is applied thereto. Heat supplied from the substrate or from an external source, such as an oven, causes the powder to fuse into a continuous film. Known fusion coating processes for the application of powder coating compositions to a substrate include electrostatic spraying, fluidized bed coating, and hot flocking.

SUMMARY

In various embodiments, an Ultraviolet Light Absorber (UVA) Universal Composition comprising about 65.0 weight percent (wt. %) to about 85.0 wt. % of a silicone resin, about 2.0 wt. % to about 7.0 wt. % of a hardener, about 0.7 wt. % to about 1.2 wt. % of a UV stabilizer, about 0.7 wt. % to about 1.2 wt. % of a flow modifier, about 15.0 wt. % to about 20.0 wt. % of a glass flake, and about 0.1 wt. % to about 0.6 wt. % of a catalyst is provided.

In various embodiments, a UVA powder coating additive composition comprising a plurality of UVA additive particles comprising a continuous phase of a silicon resin that contains a hardener, a UV stabilizer, a flow modifier, glass flakes, and a catalyst, wherein the plurality of UVA additive particles have a particle size of 0.5 to 100 μm, is provided.

Additional features and advantages will be set forth in the detailed description which follows, and in part will be readily apparent to those skilled in the art from that description or recognized by practicing the embodiments as described herein, including the detailed description and the claims.

It is to be understood that both the foregoing general description and the following detailed description are merely exemplary, and are intended to provide an overview or framework to understanding the nature and character of the claims.

DETAILED DESCRIPTION

Reference will now be made in detail to the preferred embodiment(s) and examples of the present disclosure.

In various embodiments, the Ultraviolet Light Absorber (UVA) additive compositions disclosed herein are capable of providing ultimate smoothness, heat resistance, and improved mar/scratch resistance, in addition to high priming capability and color retention.

Known UVA constituents do not possess a multifunctional characteristic with respect to impact resistance, reducing/eliminating surface defects, and retaining physical properties. Typically, in order to incorporate all of these characteristics, two or three independent additives are required. Furthermore, the known UVA additives are solvent based.

In some embodiments, the UVA powder coating additive compositions disclosed herein are in powder form and provide up to eight additional functional characteristics than those provided by known UVAs. For example, the UVA powder coating additive compositions and films formed using the UVA powder coating additive compositions as described herein can be migration free, be solvent-extraction free, have a high weathering resistance, have priming capability, have color durability high gloss retention, have high yellowing resistance, and allow for extended photo-permanence.

In some embodiments, the UVA powder coating additive compositions disclosed herein can be added to a liquid formulation or a powder formulation. The UVA powder coating additive composition (also referred to as UVA Additive Formulation) may be combined with liquids, such as water (for example, de-ionized and/or distilled), acetone, methyl-ethyl ketone (butanone), ethanol, or other, similar common industrial solvents, as well as combinations thereof. When the UVA powder coating additive composition is combined with such a liquid carrier, the liquid carrier volatilizes after the initial coating.

As described herein, a UVA powder coating additive composition formed from a combination of a silicone resin and glass flakes (for example, spherical glass flakes), blended in conjunction with additional components, such as hardeners, UV stabilizers, flow modifiers, and catalysts, and then extruded as a master batch with a silicon-containing carrier (for example, silicon dioxide or (3-aminopropyl) trimethoxysilane) can reduce orange peel significantly. The silicon-containing carrier is used in an amount of about 0.5 to 5.0% by weight based on the weight of the powder coating composition (wt %).

In some embodiments, the UVA powder coating additive composition is introduced to solid coating systems in an amount of about 0.5% to about 3 wt % or about 0.5% to about 1.5 wt %, with a majority of the remainder being a polymer powder. In some embodiments, separate conventional UV absorbers or additives such as modified polyacrylates are not necessary because the desired properties are already provided by the UVA additive particles. Such conventional UV absorbers include, for example, CHISORB-P, CHISORB 234, CHISORB 593, and CHISORB 5582 from The Cary Company; ColorMatrix Ultimate 390, ColorMatrix Lactra SX, and OnCap UV Stabilizer from PolyOne; and Tinuvin 900, Tinuvin 405, Tinuvin 292 from BASF.

Representative examples of a polyester hydroxyl resin include, but are not limited to, Crylcoat 2401-2, Crylcoat 2471-4 (from Allnex) SP-100, SP-400 (from Sun Polymers) and Rucote 102, 108, and Rucote 121 (Stepan Company).

Representative curatives useful in some embodiments include, Crelan NI2 blocked cycloaliphatic polyisocyanate, Dow Chemical TGIC (triglycidyl isocyanurate), Epikure 101 Imidazole Adduct, Epikure P-108 DICY Imidazole Adduct, aliphatic and cycloaliphatic amine curing agent from Momentive Industries and phenolic hardener DEH84 from Dow Chemical.

In some embodiments, one of the advantages of the UVA powder coating additive compositions described herein compared to other coating additives is the UVA powder coating additive composition can be inserted directly into a smooth texture coating platform binder system such as polyurethane, hybrid, TGIC, and Primid systems (manufacturers include EMS, Sun Polymer, Kukdo (Seoul, South Korea) and Dow Industries). For epoxy system platforms, the UVA powder coating additive composition can be added to Kukdo Epoxy Resins (for example, KD-211E, KD-211G, KD-242G, KD-243C), Dow's D.E.R 633U, and Vantico GT7013 epoxy resin, at about 0.5 wt % up to about 4.0% by weight of total binder weight. In addition, the UVA powder coating additive composition can also be post added/blended at about 0.03% up to about 0.9% by weight to act as an extender to current UV Absorbers in a powder coating formulation.

In some embodiments, a solid coating composition comprising about 85 to about 99.9% by weight of a finished powder coating platform (or about 85 to about 99.5 wt % or about 87.5 to about 99 wt %, or about 90 to about 98.5 wt %, or any combination thereof) and about 0.5% to about 3.0%, or about 0.5% to about 1.5%, by weight of the UVA powder coating additive composition for controlling the surface tension. In some embodiments, the finished powder contains a thermosetting resin in an amount of at least 80 wt % of the powder coating composition, or at least 90 wt %, or at least 95 wt %, or at least 97.5 wt %, or at least 99 wt %. Unless otherwise stated, all percentages stated herein are weight percentages based on the total powder coating composition or of the UVA additive composition thereof as indicated herein. Solid coating platforms can include the UVA powder coating additive composition added to a conventional thermosetting powder coating resin material. The thermosetting powder coating resin can be selected from one more of the groups of epoxy, epoxy-polyester, silicone, hydroxyl polyester, TGIC-polyester and TGIC-free polyester resins. Additional additives, such as hardeners, pigments, UV stabilizers, UV inhibitors, curatives, catalysts, degassing agents and flow aids may be included in the powder coating material composition.

Representative and suitable epoxy resins in some embodiments include Kukdo Epoxy resin KD-242H. KD-242H, is a bisphenol-A type solid epoxy resin which has excellent flow characteristics. KD-242H has an epoxy equivalent weight specification of 660-720 (g/eq), a softening point of about 85 to 95° C., and a melt viscosity of specification of about 2200 to 2800 cps at 150° C. Suitable hardeners include Kukdo KD-410J, Epikure 101 and Dyhard 100.

Dow Chemical's 663U is a solid epoxy resin and is a standard medium molecular weight epoxy resin for powder coatings application. The resin has an epoxy equivalent weight specification of 730-820 (g/eq), a softening point specification of 92-102° C. and a melt viscosity specification of 2000-4000 cps at 150° C. Suitable hardeners include Kukdo KD-401, KD-41, KD-410J, Epikure 101 and Dyhard 100.

Representative examples of epoxy-polyester resins useful in some embodiments include: Crylcoat 2401-2, Crylcoat 2471-4 from Allnex; SP-100, SP-400 from Sun Polymers; and Rucote 102, 106, and Rucote 118 from Stepan Company.

Representative examples of UV Absorbers include CHISORB-P, CHISORB 234, CHISORB 593, CHISORB 5582 from The Cary Company, ColorMatrix Ultimate 390, ColorMatrix Lactra SX, OnCap UV Stabilizer from PolyOne, and Tinuvin 900, Tinuvin 405, Tinuvin 292 from BASF.

U.S. Pat. No. 9,353,254, which is incorporated herein by reference in its entirety, describes a powder coating flow aid that is appropriate for use in formulating the additive. The flow aid comprises a polyethylene resin combined with a polyester hydroxyl resin. In some embodiments, a polymeric curative, degassing agent, ricinoleic acid (i.e., 12-hydroxy-9-cis-octadecenoic acid), and glass flake are also used. The flow aid is introduced to powder coating compositions by way of a silica carrier. In some embodiments, the flow aid comprises between about 3.1 wt. % to about 9.5 wt. % of polyethylene resin and about 35 wt. % to about 50 wt. % of the polyester hydroxyl resin. In some embodiments, the flow aid further comprises about 5.0 wt. % to about 10 wt. % of the polymeric curative, about 0.25 wt. % to about 2.0 wt. % of the degassing agent, about 0.5 wt. % to about 3.0 wt. % of the ricinoleic acid, and about 20 wt. % to about 50 wt. % of glass flakes. In such embodiments, the flow aid comprises about 0.5 wt. % to about 5.0 wt. % of the silica carrier based on the total weight of the flow aid. In some embodiments, for example, the flow aid is PF45 by Pison Stream Solutions Inc.

In some embodiments, the particle size distribution of the glass flakes can include about 10% or less with a particle size of 1000-300 µm, about 65% or more of a particle size of 300-50 µm, and about 25% or less of a particle size <50 µm. In such embodiments, the nominal thickness of the glass flakes is from about 0.5 to about 5 µm or from about 1 to about 4 µm, or from about 1 to about 3.3 µm.

The table below shows one example of a UVA Universal Composition formulation in accordance with one embodiment of the disclosure (column 2) and approximated weight ranges covering other embodiments of the disclosure.

TABLE 1

| Constituents Control Component | Example Weight (approximate) | Wt. % Ranges (approximate) |
| --- | --- | --- |
| silicone resin | 760 | 65.0-85.0 |
| hardener | 40 | 2.0-10.0 |
| UV stabilizer | 10 | 0.5-1.5 |
| flow modifier | 10 | 0.5-1.5 |
| glass flake | 177 | 15.0-25.0 |
| catalyst | 3 | 0.1-0.9 |
| Total | 1000 g | 100% |

Representative Binder Ingredient Descriptions

Silicone Resins: silicone resins containing phenyl groups with a softening point in the range of 60-85° C. and an OH content in the range of 2-5%. The silicone resin can be present in about 65.0 wt. % to about 85.0 wt. %; about 69.0 wt. % to about 82.0 wt. %; about 65.0 wt. % to about 75.0 wt. %; etc. The endpoints and ranges are inclusive and interchangeable. In some embodiments, the silicone resin is a solid. In some embodiments, the silicone resin is cured.

Hardeners: triglycidyl isocyanurate (TGIC) hardener; the hardener can be present in about 1.0 wt. % to about 10.0 wt. %; about 2.0 wt. % to about 9.0 wt. %; about 3.0 wt. % to about 7.0 wt. %; etc. The endpoints and ranges are inclusive and interchangeable.

UV Stabilizer: benzotriazole having a propane diol group. The UV stabilizer can be present in about 0.5 wt. % to about 2.0 wt. %; about 0.6 wt. % to about 1.8 wt. %; about 0.7 wt. % to about 1.2 wt. %; etc. The endpoints and ranges are inclusive and interchangeable.

Flow Modifiers: contains polyethylene and polyester hydroxyl resins, along with a curative, a degasser, ricinoleic acid, and glass flake, on a silica carrier. See U.S. Pat. No. 9,353,254, which is incorporated herein by reference in its entirety. The flow modifier can be present in about 0.5 wt. % to about 2.0 wt. %; about 0.6 wt. % to about 1.8 wt. %; about 0.7 wt. % to about 1.2 wt. %; etc. The endpoints and ranges are inclusive and interchangeable.

Glass Flakes: corrosion-resistant glass flakes having a particle size distribution between about 150 μm to about 1700 μm (80% or more). The glass flakes can be present in about 5.0 wt. % to about 30.0 wt. %; 10.0 wt. % to about 25.0 wt. %; 15.0 wt. % to about 20.0 wt. %; etc. The endpoints and ranges are inclusive and interchangeable.

Catalyst: imidazoles, including alkyl-imidazoles (e.g., 2-methyl-imidazole). The catalyst can be present in about 0.1 wt. % to about 1.5 wt. %; about 0.1 wt. % to about 1.0 wt. %; about 0.1 wt. % to about 0.6 wt. %; etc. In some embodiments, the catalyst is a $C_1$-$C_6$ alkyl imidazole catalyst. Examples include both linear and branched alkyl groups, such as, but not limited to, 2-methyl imidazole, 2-ethyl imidazole, 2-propyl imidazole, etc. The endpoints and ranges are inclusive and interchangeable.

In one embodiment, UVA additive particles may be prepared by admixing the silicone resin, glass flakes, and other components from Table 1 above. The components are admixed either with a tumbler for 40-55 minutes or with a MIXACO high speed mixer used for blending raw material constituents until such components are fully blended (e.g., 40-55 minutes for the tumbler or 45-50 seconds at ambient temperature and pressure for the high speed mixer).

The admixture is extruded to distribute the constituents and form an extrusion product. Any suitable extruder may be used, and the extruder may utilize a single or twin screw mechanism. The blended material is placed in the extruder hopper and fed via the screw mechanism to the extruder dye, preferably with three temperature zones. The zone settings may be, respectively, 60/60/140° F. In one example, the blended constituents are extruded at 300 RPM and at a feed rate of 400 g/minute to form an extrusion product.

The extrusion product is then ground into particles with a suitable grinding machine, such as a Retsch mill grinder or coffee grinder. The extrusion product is grounded for about 1-5 minutes at ambient temperature and pressure to form the UVA additive particles having a typical particle size between about 30 to 50 μm.

The UVA additive particles can include the constituents 1-6 from Table 1 above. The particles are then blended with a silicon-containing carrier (for example, 45-55 wt %) using a Henschel high speed system for micronizing to complete formation of the UVA powder coating additive composition. In some embodiments, the UVA additive particles are about 35-65 wt % of the UVA powder coating additive composition, or 40-60 wt %, or 45-55 wt %. In some embodiments, the silicon-containing carrier is 35-65 wt % of the UVA powder coating additive composition, or 40-60 wt %, or 45-55 wt %. The endpoints and ranges are inclusive and interchangeable.

In some embodiments, the UVA powder coating additive composition comprises a plurality of UVA additive particles comprising a continuous phase of a silicon resin, wherein the silicon resin comprises a hardener, a UV stabilizer, a flow modifier, glass flakes, and a catalyst, and wherein the plurality of UVA additive particles have a particle size in the range of about 0.5 μm to about 100 μm. In some embodiments, the hardener, UV stabilizer, flow modifier, glass flakes, and catalyst are uniformly distributed within the silicon resin.

Representative characteristics of the disclosed UVA powder coating additive composition include:

The UVA powder coating additive composition can provide ultimate smoothness, heat resistance, and improves mar/scratch resistance, in addition to high priming capability and color retention.

The UVA powder coating additive composition can provide high yellowing resistance and retain physical properties that increases shelf life.

The UVA powder coating additive composition can provide high gloss and color retention, with a strong priming capability that increases the shelf life of the system.

The UVA powder coating additive composition protects against thermal and light degradation, and provides strong weathering resistance, which aids in retaining physical properties; therefore, increasing the shelf life of the system.

The UVA powder coating additive composition improves flow, surface tension, and mar/scratch resistance, and the composition resists crack formation and retains physical properties of the system.

The UVA powder coating additive composition imparts high thermal stability and environmental permanence for coatings that are exposed to high bake cycles or extreme environmental conditions.

The UVA powder coating additive composition is cured in 20 minutes at 350° F., in 15 minutes at 375° F., or 10 minutes at 600° F., using a convection oven, such as laboratory oven from Blue M (White Deer, Pa.).

In some embodiments, the powder coating composition comprising the UVA powder coating additive composition comprises about 0.4% (4 grams) or about 0.5% (5 grams), or about 0.6% (6 grams) to about 1.5% (15 grams) or about 2.0% (20 grams) or about 3.0% (30 grams) of the UVA powder coating additive composition per 1000 grams of the powder coating composition. In some embodiments, the UVA powder coating additive composition is present in an amount not more than 1.5%. In some embodiments the UVA powder coating additive composition is present in an amount not more than 0.6%. The endpoints and ranges are inclusive and interchangeable.

PROCESSING EXAMPLE

The components that make up the formulation, such as resins (for example, epoxy resin, epoxy-polyester resin, hydroxyl polyester resin, TGIC polyester, TGIC-free polyester resin, silicone resin, acrylic resin, etc.), polymeric curatives, and other additives (for example, flow control agents, hardeners, catalysts, fillers, gloss control agents, pigments, charge inhibitors, etc.) are blended together and combined to form a premix. These components are admixed with a tumbler, a Henschel high speed mixer, a MIXACO mixer, or by bag blending for as long as it takes for the admixture to be fully blended (for example, 25 seconds, 1 minute, 5 minutes, 10 minutes to 45 minutes, etc.).

The constituents are pre-batched using analog and analytical scales, weighed, and then loaded on to a mezzanine located directly above the extruder. The premix can be loaded into a feed box which is metered (for example, at settings of 1.5 or 10 units) and gravity fed directly into the hopper, which rests on top of the barrel of the extruder.

The barrel of the extruder is a heated steel cylinder with an auger-type screw or screws rotating inside of it. The screw's rotation takes the premix pellets, mixes the components of the melt, and pushes them forward of the barrel. There are three heating and cooling zones in an extruder (part of barrel), a typical single-stage screw consists of the feed zone, compression zone, and a metering zone. The zone settings can range from 55-70° F. for the feed zone, 55-70°

F. for the compression zone, and 130-150° F. for the metering zone. The blended constituents can be extruded at around 250-350 RPM and at a feed rate of 350 to about 450 g/min to form an extruded product.

Once the extrudate is melted and exited through the die, the freshly extruded product is allowed to cool. The cooling step is carried out on a flat surface, such as a cooling belt. After cooling (for example, by passing along a cooling conveyer belt), the extrudate takes the form of a sheet or ribbon.

The extrudate sheets or ribbons are then fed into a flaker, where the sheets/ribbons are cut into smaller, more uniform-sized particles. The extruded flakes are then fed into a grinding machine suitable to grind the materials down to a powder having a particle size of about 20 microns or less (for example, about 3 μm to about 18 μm; about 5 μm to about 15 μm; etc.). The endpoints and ranges are inclusive and interchangeable.

A powder having a particle size of about 5 microns to about 15 microns is then collected and packaged as the UVA additive particles. The UVA additive particles can be combined with other ingredients (for example, a silicon-containing carrier and/or glass flakes) to form a UVA powder coating additive composition.

The UVA powder coating additive composition may be added to liquid or powder formulations. The formulation may be combined with a liquid carrier, such as water (preferably deionized and/or distilled), acetone, methyl-ethyl ketone (butanone), ethanol, other similar industrial solvents, or combinations thereof. During use, when the UVA powder coating additive composition is applied using a liquid carrier, the initial coating will appear after the liquid carrier volatilizes.

The screw diameter of the extruder can be 19 mm, 26 mm, 32 mm, 50 mm, 80 mm, or larger, and it can be a single screw type or a twin screw type. The length/diameter (L/D) ratio of screws depends on the size of the extruder and can vary from 20:1 to 30:1.

The hoppers can be a conical hopper, wedge (plane-flow) hopper, transition hopper, square opening hopper, pyramid hopper, chisel-shaped hopper, etc. The hopper can come in different sizes depending on the extruder, and the possible load of premix it can hold ranges from 25 lbs. to 2000 lbs.

The grinding machine can be an Air Classifying mill, which is an air swept mechanical impact mill with a dynamic air classifier designed to grind materials; a Retsch mill grinder, or a coffee grinder. In the grinding phase, the extrudate is ground for about 1-5 minutes at ambient temperatures and pressure to form the UVA additive particles having a typical particle size of less than 20 microns.

Following grinding, the UVA additive particles undergo a blending step. On completion of the blending, the final copolymer, including the UVA additive particles, should have a particle size in the range of about 0.5 μm to about 5 μm.

Having described the invention in detail and by reference to preferred embodiments thereof, it will be apparent that modifications and variations are possible without departing from the scope of the invention as defined by the following claims.

What is claimed is:

1. A UVA powder coating additive composition, comprising:
   a plurality of UVA additive particles comprising a continuous phase of a silicon resin,
   wherein the silicon resin comprises a hardener, a UV stabilizer, a flow modifier, glass flakes, and a catalyst, and
   wherein the plurality of UVA additive particles have a particle size in the range of about 0.5 μm to about 100 μm.

2. The UVA powder coating additive composition of claim 1, wherein the plurality of UVA additive particles comprise:
   from about 73 wt % to about 78 wt % of the silicone resin;
   from about 2 wt % to about 7 wt % of the hardener;
   from about 0.7 wt % to about 1.2 wt % of the UV stabilizer;
   from about 0.7 wt % to about 1.2 wt % of the flow modifier;
   from about 15 wt % to about 20 wt % the glass flakes; and
   from about 0.1 wt % to about 0.6 wt % of the catalyst;
   wherein the percentages are based on the weight of the plurality of UVA additive particles.

3. The UVA powder coating additive composition of claim 1, wherein the catalyst is a $C_1$-$C_6$ alkyl-substituted imidazole.

4. The UVA powder coating additive composition of claim 1, wherein the silicone resin has a softening point of 65-85° C. and an OH content of 2-5%.

5. The UVA powder coating additive composition of claim 1, wherein the hardener is triglycidyl isocyanurate (TGIC).

6. The UVA powder coating additive composition of claim 1, wherein the UVA additive particles have a particle size in the range of about 5 μm to about 15 μm.

7. The UVA powder coating additive composition of claim 1, wherein the plurality of UVA additive particles further comprise one or more of a UV inhibitor, a curative, a pigment, and a degassing agent.

8. The UVA powder coating additive composition of claim 1, further comprising a silicon-containing carrier.

9. The UVA powder coating additive composition of claim 8, comprising 30-70 wt % of the plurality of UVA additive particles and 30-70 wt % of the silicon-containing carrier.

10. The UVA powder coating additive composition of claim 8, comprising:
    45 to 55 wt % of the plurality of UVA additive particles; and
    45 to 55 wt % of the silicon-containing carrier.

* * * * *